UNITED STATES PATENT OFFICE.

HERMAN KRUSE, OF JERSEY CITY, AND WILLIAM C. KRUSE, OF UNION, NEW JERSEY.

INK.

1,309,292.      Specification of Letters Patent.      Patented July 8, 1919.

No Drawing.      Application filed January 20, 1919. Serial No. 271,957.

*To all whom it may concern:*

Be it known that we, HERMAN KRUSE and WILLIAM C. KRUSE, citizens of the United States, residing at Jersey City, New Jersey, and town of Union, New Jersey, in the county of Hudson and State of New Jersey, have invented certain new and useful Improvements in Inks, of which the following is a specification.

Our invention relates to improvements in inks, and more particularly has reference to an ink adapted for use upon a mimeograph, or a machine of like character.

One of the objects of our invention is to produce an ink which will remain moist in the pad while at the same time it shall have the quality of drying rapidly on the paper, so that after each operation of the mimeograph, the printed sheets may fall, one upon the other, without danger of smudging. Our ink is especially adapted for use in an oscillating mimeograph or similar machine in which the ink is drawn through the pad and through the waxed stencil by means of capillary attraction.

In the case of inorganic pigments and carbon black pigments, in carrying out our invention, we grind the pigments in a mixture of glycerin and Turkey-red oil.

We are aware that barium sulfate, and glycerin have been ground together, after which Turkey-red oil has been added to produce an ink of this character and such an ink is described in U. S. Letters Patent to Robert W. Hochstetter, issued July 20, 1909, No. 928450, but in the Hochstetter patent it is stated that organic or lake pigments are usually constructed with alumina white as their base and that as such if ground with glycerin, an ink would be produced which could not be used on an oscillating mimeograph or machine of similar character as it is alleged that it would soon become stiff and jelly-like on standing and could not then be brought through the pad and stencil. It is stated in the Hochstetter patent that this is due to the chemical re-action of the glycerin and the alumina white, but this we have found not to be the case, and on the contrary we have found that an ink of high excellence may be produced with alumina white and that there is no such chemical re-action encountered in the manufacture of such ink, and it is more particularly to an ink of this character that this invention is especially directed.

A very desirable and successful ink may be made as follows: 96 parts of sulfonated oil (Turkey-red oil) to 24 parts of glycerin; 4½ parts of say purple lake on an alumina hydrate base with 4½ parts of alumina hydrate. The sulfonated or Turkey-red oil employed must be free from acid or alkali and should be tested to make certain of this in order that only the neutral oil be employed, and for a summer ink the sulfonated oil should be about what is known as about 70 per cent. or of what is known as about 60 per cent. for a winter ink in order to insure the proper density. Of course if it is desired to cheapen the product, some barium sulfate (blanc fixe) may be employed in which case the proportions should be varied about as follows: 96 parts of neutral sulfonated or Turkey-red oil to about 24 parts of glycerin with about 4 parts of say purple lake on alumina hydrate base with 4 parts of alumina hydrate and 16 parts of barium sulfate, and in either case these several ingredients may be all thoroughly mixed and ground simultaneously without fear of any undesirable chemical re-action. Of course, instead of using purple lake, any other of the lakes may be employed, this being of course well known to those familiar with the art.

In the preparation of the black ink a suitable formula would be as follows: 108 parts of the neutral sulfonated or Turkey-red oil to 12 parts of glycerin, 4½ parts of carbon black and 1 part of alumina hydrate, and also 1½ parts of milori blue.

Should the sulfonated or Turkey-red oil obtained contain alkali, by putting from three to five per cent. acetic acid into the same, the same will be neutralized, or should it contain acid by putting the same percentage of ammonia water therein it will become neutralized. Any of the well known methods of testing for either alkali or acid may of course be resorted to.

Of course it will be understood that various modifications and changes may be made without departing from the spirit of the invention as claimed.

We claim:

1. An improved ink comprising alumina white (hydrate), glycerin, and neutral sulfonated oil.

2. An improved ink consisting of a neutral sulfonated oil, glycerin, alumina white and a lake.

3. An improved ink consisting of 96 parts neutral Turkey-red oil, 24 parts of glycerin, 4½ parts of a lake on an alumina hydrate base, and 4½ parts of alumina hydrate.

In testimony whereof we hereunto affix our signatures in the presence of two witnesses.

HERMAN KRUSE.
WILLIAM C. KRUSE.

Witnesses:
ANNA F. DUFFY,
THOMAS A. HILL.